Aug. 2, 1938.  S. SCHIFF  2,125,654
DOUGH PROOFING MACHINE
Filed July 9, 1935  4 Sheets-Sheet 1

Inventor
Sigmund Schiff
By Murray and Zugelter
Attorneys.

Aug. 2, 1938.   S. SCHIFF   2,125,654
DOUGH PROOFING MACHINE
Filed July 9, 1935   4 Sheets-Sheet 3

Inventor
Sigmund Schiff
By Murray & Zugelter
Attorneys.

Aug. 2, 1938.   S. SCHIFF   2,125,654
DOUGH PROOFING MACHINE
Filed July 9, 1935   4 Sheets-Sheet 4

Inventor
Sigmund Schiff

By Murray & Zugelter
Attorneys.

Patented Aug. 2, 1938

2,125,654

UNITED STATES PATENT OFFICE 2,125,654

DOUGH PROOFING MACHINE

Sigmund Schiff, Cincinnati, Ohio, assignor to The J. H. Day Company, Cincinnati, Ohio, a corporation of Ohio Application July 9, 1935, Serial No. 30,481

10 Claims. (Cl. 198—31)

The present invention relates to a dough proofing machine, and an object thereof is to improve upon the general character of machine set forth in my prior United States Letters Patent numbered 1,899,246, dated February 28, 1938.

One important object of the present invention is to provide a dough proofing machine which is by far more compact than any heretofore known.

Another object is to provide a dough proofing machine having a particular arrangement of elements such as permits a great saving of floor space and convenient installation in a corner or against a wall of a building rather than along a ceiling thereof.

Other objects of the invention are: to provide a machine of the character stated, which is so constructed that it may be installed in a bakery with a great saving of time, labor, and expense; to provide for sectional shipping and assembly whereby handling and installation problems are effectively simplified; to secure and maintain a highly synchronized and regular movement of dough lumps through and from the proofer; to provide a construction which is adapted to be easily altered for proper installation of the machine under possible adverse conditions imposed by the nature of a building in which installation is desired; and to provide retaining means for precluding a possible accidental discharging of dough lumps as they shift position in a certain part of the machine.

The foregoing and other objects are attained by the means described herein and disclosed in the accompanying drawings, in which.

Figure 1:
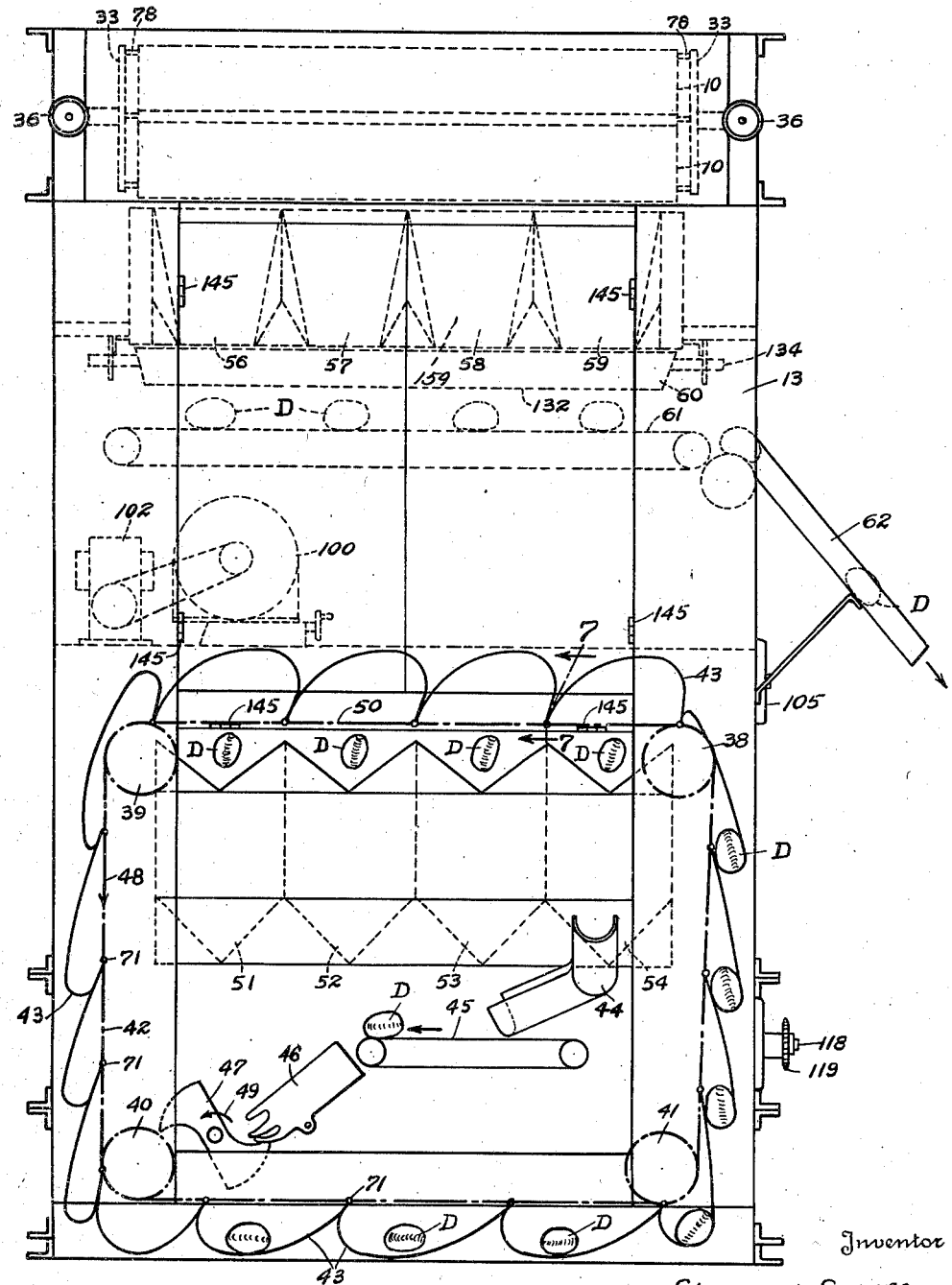
Fig. 1 is a front elevational view of the proofing machine of the invention, showing principally the dough lump transfer section thereof.

The dough proofing machine of this invention is of the type which employs a series of flexible loops or pockets that are carried along a circuitous or sinuous path through an enclosed proofer casing. The loops or pockets preferably are of fabric or other flexible sheet material, and are supported in spaced relationship by means of a pair of spaced parallel endless chains in substantially the manner disclosed in my prior patent, above identified. The various loops or pockets are identified by the reference character 10, and the endless chains which support them are indicated by the characters 12. The proofing machine is constituted of two major sections, the section 13 at the left of the upright 14 being the lump transfer section, and the section 15 at the right of upright 14 being the proofing section. The proofing section contains a series of vertical chain reaches 16 to 23 inclusive, which are supported by the sprockets 24, 25, 26, and 27 at the upper portion of the proofing section, and by similar sprockets 28, 29, 30, 31 and 32 at the lower portion thereof. The pocket or loop carrier chain 12 extends over into the transfer section 13 of the proofing machine, to engage a sprocket 33, and to provide the discharging reach 34. Intermediate the sprockets 33 and 35, suitable mechanism is provided, as will be explained, for inverting the loops or pockets successively to discharge the proofed dough lumps into the transfer section of the proofing machine.

The proofing section 15 of the machine is relatively simple of construction and requires no elaborate explanation, except that it may be noted that all of the sprockets above referred to are supported upon stud shafts at opposite sides of the section to enable unrestricted movement of the flexible pockets vertically within the section and about the peripheries of the sprockets continuously and at a predetermined rate of linear travel of the chains 12. It will be understood that for each of the sprockets shown in Fig. 2, there is a corresponding sprocket at the far side of the machine for supporting a chain similar to the endless chain 12, these chains being adapted to move in unison so that the flexible pockets supported therebetween will always remain in a horizontal position. The series of pockets or loops 10 preferably are of such dimensions as to receive a plurality of loaves, generally four or five in number, the loaves being spaced apart from eight to fourteen inches. The capacity of the proofing machine, therefore, may approximate several hundred loaves.

Figure 2:
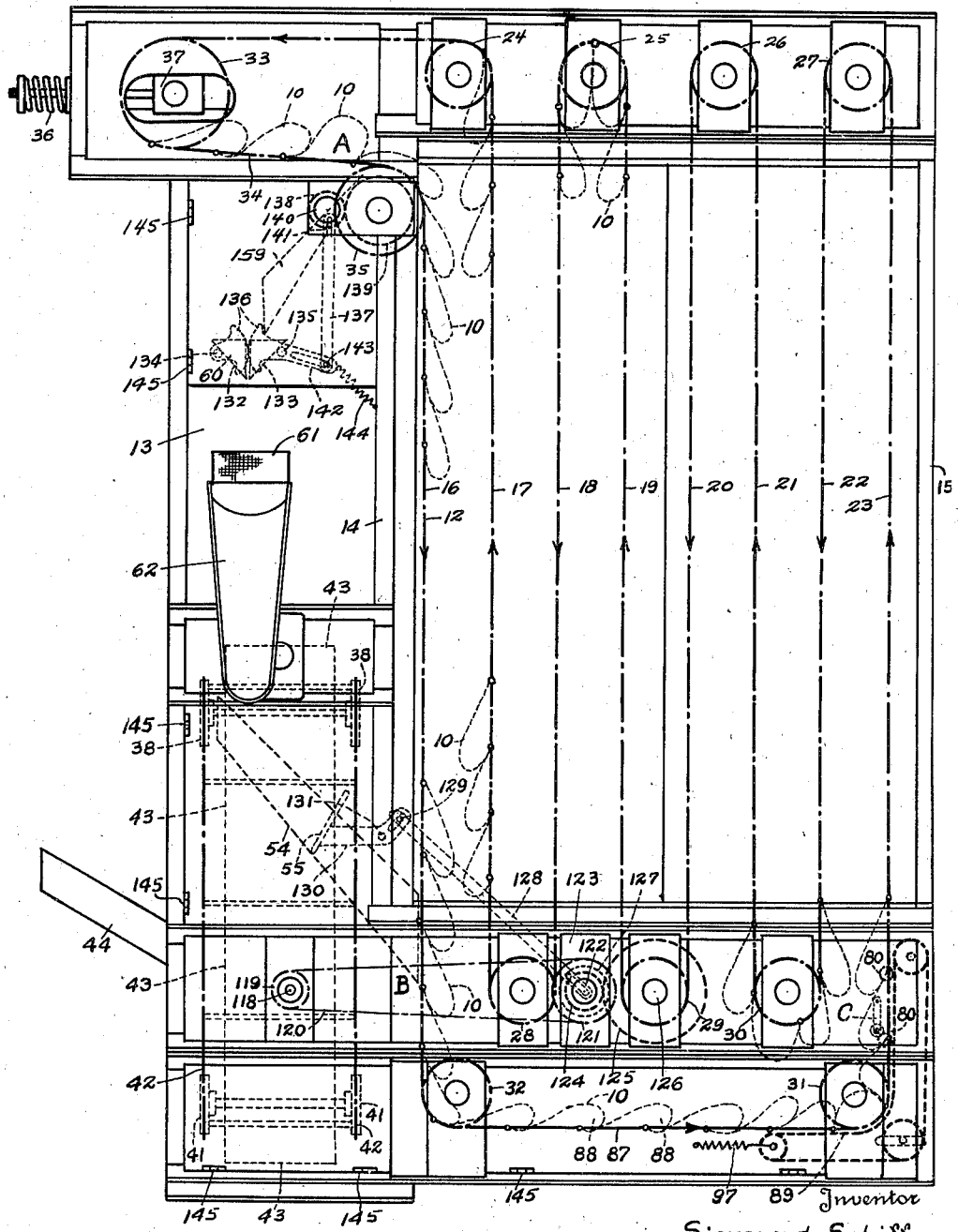
Fig. 2 is a side elevational view of the Fig. 1 machine.

At the upper left hand corner of Fig. 2 is disclosed a chain tightener 36 which may be of any suitable construction, operating to horizontally shift the bearing block 37 which supports the stud shaft of sprocket 33. As shown, the bearing tightener may consist of a central screw having a nut on the end thereof with a spring interposed between the nut and a wall of the section, so that the bearing block yieldingly takes up any slack in the chain. A chain tightener 36 is provided at each side of the machine, as shown in Fig. 1, to tighten both of the pocket-supporting chains 12. The chains are driven in the direction indicated by the arrows of Fig. 2, and the means of driving the chains will be set forth hereinafter.

The transfer section 13 of the machine contains practically all of the mechanism for driving the entire machine and for handling the dough lumps prior to and after the proofing thereof in the proofing section of the machine. The transfer section preferably is a unit in itself, which may be assembled, shipped and set up independently of the proofing section 15. Within the transfer section, in approximately the lower half thereof, are mounted pairs of sprockets 38, 39, 40 and 41, the axes of which form substantially a rectangle (Fig. 1), and extend at right angles to the axes of the sprockets within the proofing section. Extending about the sprockets 38, 39, 40, and 41 is an endless chain 42, it being understood that the sprockets and endless chain are duplicated behind the sprockets and chain shown in Fig. 1, so that the second series of flexible pockets or loops 43 will be supported between the chains in substantially the same way that the pockets 10 are supported in the proofing section. The flexible pockets or loops 43, however, are each adapted to contain a single loaf and they may therefore be much narrower than the pockets or loops 10.

Within the space enclosed by the endless chain 42, there is built a loaf intake and loading mechanism which comprises an intake chute 44 that delivers dough lumps onto a driven spacer belt 45 which conveys the lumps to an inclined basket 46, whence the loaves are removed successively by means of the double armed pick up element 47 which deposits the dough lumps in successive loops or pockets 43. The loops or pockets 43 and the chain upon which they are supported, travel in the direction indicated by the arrow 48, and the pick up element rotates in the direction indicated by the arrow 49. It is to be understood that loading mechanisms other than that shown at 46—47 may be employed, if desired, it being necessary only that the intake and loading apparatus be of such size and character as to work within the enclosure provided by the chain 42, and to load the pockets or loops 43 as they pass beneath the loading apparatus.

The upper reach 50 of the chain 42 has associated therewith a means for effecting positive simultaneous discharge of the dough lumps from groups of pockets, each group comprising a number of pockets 43 corresponding to the number of lumps to be fed into a single loop or pocket 10 of the proofing section. The lumps thus discharged fall into the individual loading chutes 51, 52, 53, and 54, all of which chutes direct the loaves downwardly, as disclosed by Fig. 2, to enter a flexible loop or pocket which is at the proper time aligned with the series of loading chutes. Each loading chute is provided with a gate 55 adapted to be mechanically withdrawn from the chutes at such time that a pocket or loop 10 is in position for reception of a charge of dough lumps. The movement of the series of gates 55 is synchronized with the movement of the loops or pockets in the loading reach 16 of the chain 12. From the foregoing, it should be understood that as each loop or pocket 10 reaches a position in registration with the mouth of each chute 51, 52, 53 and 54, a plurality of lumps will be fed thereto from the inverted loops or pockets 43 of Fig. 1.

From the loading or charging position, the loops 10 (Fig. 2) travel downwardly about sprocket 32 and horizontally to the sprocket 31, and then upwardly along the path of movement indicated at 23. Thereafter the pockets or loops follow a sinuous path, vertically, upwardly and downwardly, until they reach the sprocket 24, where the chain extends about the sprocket 33 and returns to the proofing section by way of the sprocket 35. At a point between the sprockets 35 and 33 the loops discharge their dough lumps into a series of discharging chutes 56, 57, 58, and 59 which direct the lumps into an intermittently operating discharge gate 60. The discharge gate is adapted to open and close in synchronism with the discharging of the loops or pockets 10 to place the dough lumps in spaced relationship upon a conveyor belt 61 which carries the lumps to an exterior chute or conveyor 62 (Fig. 1), which latter chute ordinarily feeds a dough molder.

The foregoing describes briefly the general arrangement of parts of the machine, and the mode of operation. A detailed explanation follows.

Figure 7:
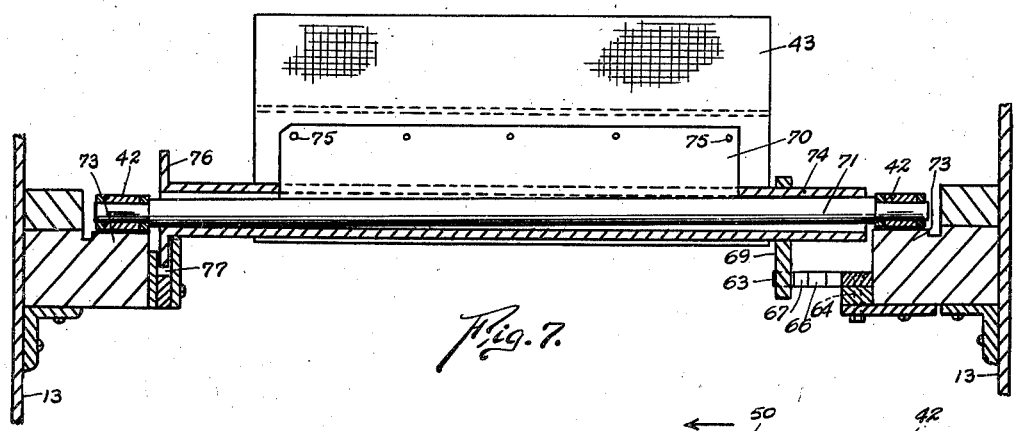
Fig. 7 is an enlarged cross-sectional view taken on line 7—7 of Fig. 1.
Figure 8:
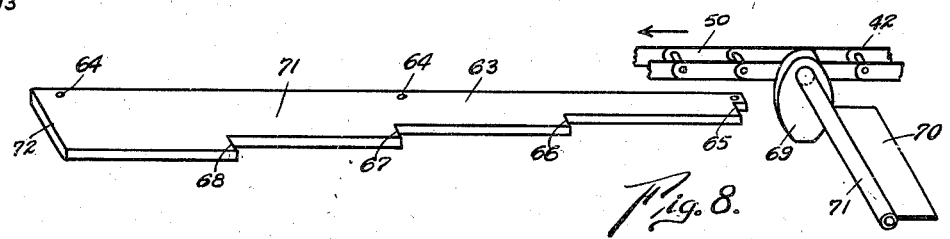
Fig. 8 is a perspective view of a loop tilting discharge means.

As the chains 42 (Fig. 1) travel in the direction indicated, to carry the loops 43 past the loading means 46—47 and upwardly to the discharging position, the dough lumps at the upper reach of each chain are discharged simultaneously, as indicated, by means of any suitable mechanism, one form of which is disclosed in Figs. 7 and 8. In these views, 63 indicates a cam plate which is fixed horizontally upon the machine frame, as at 64, in parallelism with the upper reach 50 of chain 42. The cam plate is so arranged that its various steps or abutments 65, 66, 67 and 68 may be engaged by cams such as 69 which are mounted stationarily relative to fins 70 of the loop or pocket structures, so that the fins will move to a substantially vertical elevated position when their associated cams strike the steps or abutments of the cam plate. The fins, being riveted or otherwise fixed to the canvas loops or pockets 43 as disclosed in Fig. 7, are thus under the control of the fins and cams, and may be inverted as shown in Fig. 1, by the tilting of the cams resulting from their riding up onto the face 71 of the cam plate. If, for example, four loops or pockets are to be inverted simultaneously for discharging their dough lumps, the cam plate 63 will be provided with four steps, as shown, spaced apart a distance corresponding to the distance from one loop or pocket to another, and located out of alignment with one another. The four cams of each group of four loops to be inverted, are fixed upon the shafts or loop rods 71 at various distances from the chains, to engage a given step of the cam plate. Thus, the first one of a group of four loops may have its cam adjusted to pass the three cam steps 65, 66, and 67, but to strike the fourth cam step 68; the cam of the second loop will strike only the cam step 67; the cam of the third loop will strike only the cam step 66; and the cam of the fourth loop will strike only the cam step 65. By spacing the cam steps apart the distance between successive loops, the cams of each loop group will strike their respective cam steps simultaneously, to discharge the lumps of dough simultaneously into the separate chutes 51, 52, 53 and 54. The loops will of course remain inverted, as disclosed in Fig. 1, until the cams pass over the rear edge 72 of the cam plate, (Fig. 8). The rear edge of the cam plate would be located in the vicinity of the sprocket 39 of Fig. 1, as will be evident.

From the foregoing, it should be understood that the loop or pocket tilting means of Fig. 8 will operate to invert simultaneously the loops of every group of loops, when said loop groups reach a position above the chutes 51, 52, 53 and 54. The pockets 10 of the proofing section thereby are supplied with a plurality of dough lumps as they reach the charging position at the lower ends of chutes 51, 52, 53 and 54, (see Fig. 2).

Figure 9:
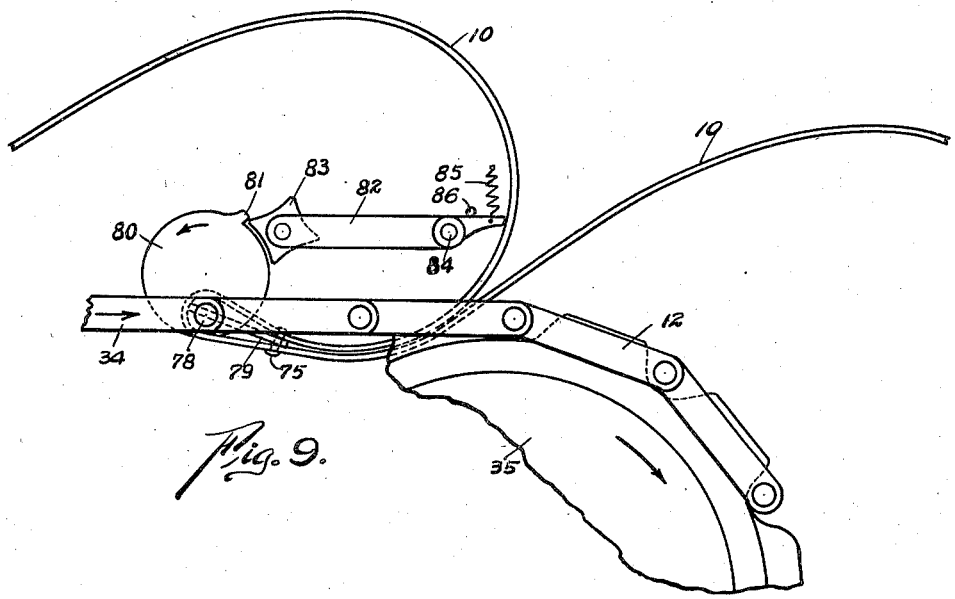
Fig. 9 is an enlarged fragmental elevational view of a second type of loop discharging means.

It is to be understood that Fig. 8 discloses a schematic form of cam and fin arrangement, and that Fig. 7 shows the arrangement in detail. In the detailed view, the shaft 71 is secured at its opposite ends to the chains 42. The links of the chain ride upon the supports 73 which are fixed to the casing 13 immediately below the upper reaches of the chains. The shaft 71 is encircled by a sleeve 74 to which are fixed the cam 69 and fin 70. Rivets for securing the loop material to the fin are indicated at 75. The Fig. 9 illustration may be referred to for a clearer understanding of the relationship between the loop material and the fin. In Fig. 7, the sleeve 74 is shown to include a guide plate 76 adapted to move through a fixed channel 77 for the purpose of maintaining the various cams 69 in alignment with the proper cam steps of plate 63. The channel and the supports 73 are provided only along the upper horizontal reaches of the chains 42.

With reference now to Fig. 9, it may be stated that the means therein disclosed is a second type of loop inverter or discharger. This type of device is adapted particularly for installation at the location "A" of Fig. 2, at which location the loops or pockets 10 of the proofing section are manipulated to discharge their contents into the transfer section of the machine. Although a specific type of discharging means is disclosed, it is to be understood that other means may be substituted therefor. It is also quite possible that a variation of the Fig. 8 means could be employed at the location "A" of Fig. 2. In accordance with Fig. 9, the shaft 78 of each pocket or loop 10 carries the fixed fin 79 as usual, and in addition there is eccentrically fixed relative to said shaft the cam ring or disc 80. The ring 80 is so related to the shaft that a lug or extension 81 thereof is presented to a push-over device or tilting mechanism 82 when the loop is advanced thereto by the chain as indicated at 34 of Figs. 2 and 9. It is of course to be assumed that in the Fig. 9 position of the left-hand loop 10, a dough lump is resting therein to the right of shaft 78. When the star-wheel 83 engages the lug 81, the ring 80 and its shaft 78, as well as fin 79, will be rotated in a counter-clockwise direction of rotation thereby to elevate the fin to an angle approaching the vertical, at which position the loop will be substantially inverted and caused to discharge its proofed lumps of dough. The several dough lumps thus discharged from each loop 10 fall individually into the chutes 56, 57, 58 and 59, (Figs. 2 and 1). The star wheel may be rotatably mounted upon the arm 82 which is pivoted upon the machine frame by means of a pivot 84, and a spring 85 may be employed to normally urge the arm to the lug-engaging position which is determined by a stop 86. The amount of rotation to be imparted to the fin shaft may be determined by the location of the lug 81 on the ring or disc 80, or by the position of the pivot 84, as will be understood. It is desirable to apply one of the Fig. 9 devices or its equivalent, near the lower ends of chutes 51, 52, 53 and 54, that is, at the location "B" in Fig. 2, for the purpose of slightly distending the loops at that point so as to condition them for positive reception of the dough lumps directed thereto by the chutes. The device would in this instance be adjusted or limited in its action, as above stated, so as to tilt the pockets or loops only slightly, or sufficiently to enable proper entry of any dough lumps that might be too light in weight to substantially open the pockets or loops by their impact force.

Attention is now directed to the lower right hand corner of the Fig. 2 view, where the loops carrying the dough lumps change their direction of travel from horizontal to vertical. The loops 10 on the horizontal reach 87 of the chain are necessarily inverted, due to the manner in which they descend with the charging reach 16, and said loops carry their dough lumps in the lapped-over end regions 88 of the loops. When the loops change their direction of travel at the sprocket 31, they must shift their contents to the opposite ends of the loops and in so doing there is created a condition which could result in a premature discharge of the contents. This condition necessarily results from the effort to make a vertical type of machine which is unusually compact, but the premature discharge is effectively overcome by attaching the retaining means 89 of Fig. 5. In the preferred form, the retaining means comprises the flexible endless belt or sheet 90 of fabric or other suitable material, which is supported upon the rotating rollers 91, 92, and 93 for movement with the chains 12 and their loops or pockets 10. The concave portion of the retainer, in the region of the reference character 92, contacts the loop conveyor and effectively closes the open mouths of the loops so that the dough lumps cannot escape therefrom when the loops begin their upward direction of movement at the sprockets 31. It has been satisfactorily demonstrated that the belt 90 need not be driven independently, but may be driven merely by the frictional engagement thereof with the loop conveyor of the proofer. To increase the frictional engagement, transverse strips of leather or like material may be riveted or otherwise fixed to the working face of belt 90, as indicated by the character 94. The device indicated at "C" is a tilting mechanism similar to the Fig. 9 device, for effecting positive righting of the pockets.

Figures 5, 6:
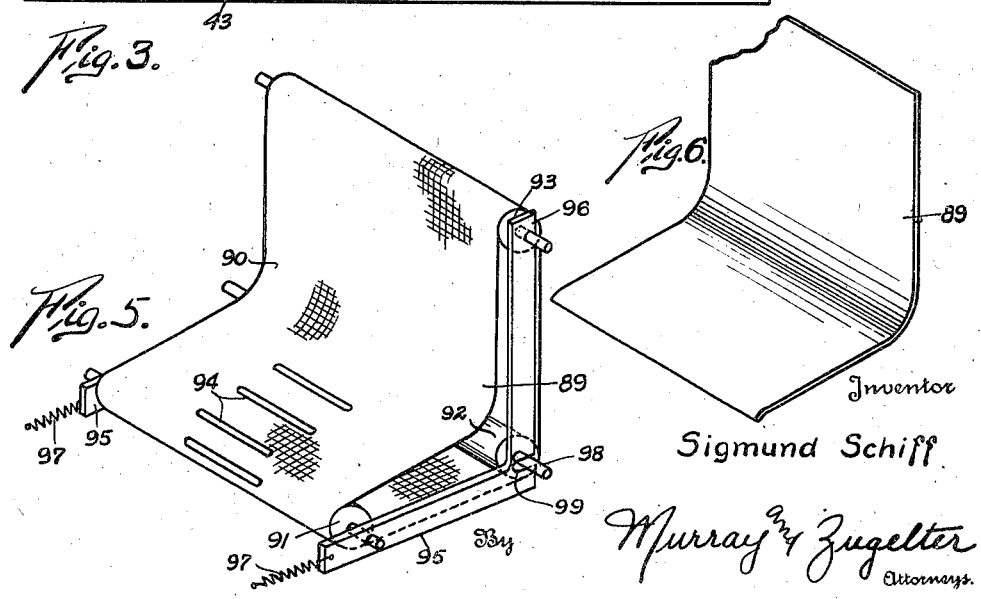
Fig. 5 is a perspective view of a dough lump retainer which forms part of the present invention.
Fig. 6 is a perspective view of a modified form of dough lump retainer.

In accordance with Fig. 5, the rollers 91, 92, and 93 have their ends supported upon the L-shaped cradle elements 95. The opposed upper ends 96 of the cradle elements are adapted to be hingedly supported upon the machine frame to dispose the belt 90 in the position of Fig. 2. Springs 97 may be provided for yieldingly urging the assembly toward the loop conveyor. The roller 92 preferably is rotatable upon its shaft 98, so that the shaft ends may be adjusted in the slide bearing 99 and fixed therein at adjusted positions, by the use of any commonly known bearing adjustment means, (not shown), such adjustment means being ordinarily built in the manner shown at 37 of Fig. 2.

This construction provides for tightening or adjusting the belt 90 relative to the loop conveyor.

Fig. 6 discloses a simplified form of retainer that may be used in place of the Fig. 5 retainer, and it may be constructed of metal or other substantially rigid sheet material bent to L shape as shown and supported in the same position relative to the loop conveyor as is disclosed in Fig. 2. Like the device of Fig. 5, the Fig. 6 device may be yieldingly supported, if desired. The arc of its curved portion would of course correspond substantially with the curvature of the adjacent sprocket periphery.

The entire machine may be driven by means of a single motor 100 which is supported preferably within the transfer section 13 just below the conveyor 61. The motor may be provided with a speed changer 102 which drives a sprocket 103 and an associated shaft 104 that extends to a bearing 105 at the side of the machine. Shaft 104 drives a bevel gear 106 which in turn drives the two bevel gears 107 and 108. A sprocket 109 on the shaft of gear 108 drives the conveyor 61 by means of a chain 110, and a sprocket 112 on the shaft of gear 107 drives the loop conveyor 42 by means of the chain 113 and sprocket 114.

The main shaft 104 has fixed thereon a sprocket 115 which, by means of a chain 116, drives a sprocket 117 and a shaft 118. The said shaft carries another sprocket 119 over which passes a chain 120 that drives a sprocket 121 on shaft 122 which is journaled in a bearing block 123 secured to the proofing section of the machine. On the shaft 122 is fixed a pinion 124 which meshes with a gear 125 that is fixed upon a transverse shaft 126 extending to the opposite side of the machine. The shaft 126 carries the fixed sprockets 29, of which only one is shown, for driving the chains of the entire loop conveyor 12. Thus it will be understood that the shaft 126 is the drive shaft for the proofing section of the machine.

The shaft 122 carries a fixed plate 127 to which is loosely pivoted the lower end of a connecting rod 128, the upper end of which rod has a loose-pivot or sliding pivotal connection at 129 with the arm 130 which actuates the gates 55. The gate arm has a fixed pivot 131 on the machine frame, and movement of the gates is coordinated with the movement of loops 10 and 43, so that a charge of dough lumps from loops 43 will be directed into the loops 10 when the latter are in registration with the chutes 51, 52, 53 and 54. It will be understood that each of the chutes just mentioned is provided with a gate such as 55, and all the gates are moved in unison by the connecting rod 128. As stated hereinbefore, a series of loops 43 of the transfer section of the machine, release their dough lump charges into the chutes simultaneously, one for each chute. The dough lumps are indicated by the characters D.

Beneath the discharge location "A" of Fig. 2, there is provided the chute structure 159 which directs the gang of dough lumps from loops 10 into the upper gate 60, preparatory to disposition of the lumps upon the conveyor belt 61 which leads the lumps from the machine. The chute structure comprises the separate chutes indicated by the characters 56, 57, 58 and 59, (Fig. 1), which guide the dough lumps into the gate structure 60. The gate structure may comprise a pair of trough parts indicated by the triangular formations 132 and 133 of Fig. 2, which parts are pivoted, respectively, by means of rock shafts 134 and 135. The arcs indicated by the broken lines 136 represent a pair of meshing gear segments which are fixed upon the rock shafts. Thus, by rocking the shaft 135 by means of a movable arm 137, the gear segments act to move the trough parts together and apart thereby to provide an intermittently opening and closing gate structure which determines the timing of dough lump discharge onto the belt 61 and effects an equal spacing of lump groups upon said belt. The rocker arm 137 is moved in timed relation with the discharging action of the dough lumps from pockets or loops 10, and it may be actuated by means of the gears 138 and 139. Gear 139 is fixed relative to the sprocket 35 and it meshes with the smaller gear 138 which rotates a plate 140 that carries a pivot 141 cooperating to reciprocate the rocker arm 137. The rocker arm has a similar pivotal connection with an extension 142 on one of the segments 136, as indicated at 143. A spring 144 may be employed to yieldingly urge the trough parts 132 and 133 to the closed or meeting positions. The pivotal connection at 141 is preferably made shiftable, as shown, to provide for a delayed but quick movement of the gate parts as will be understood. This is true also of the pivotal connections at the ends of the connecting rod 128 which actuates gates 55 in the lower chute structure.

Figures 3, 4:
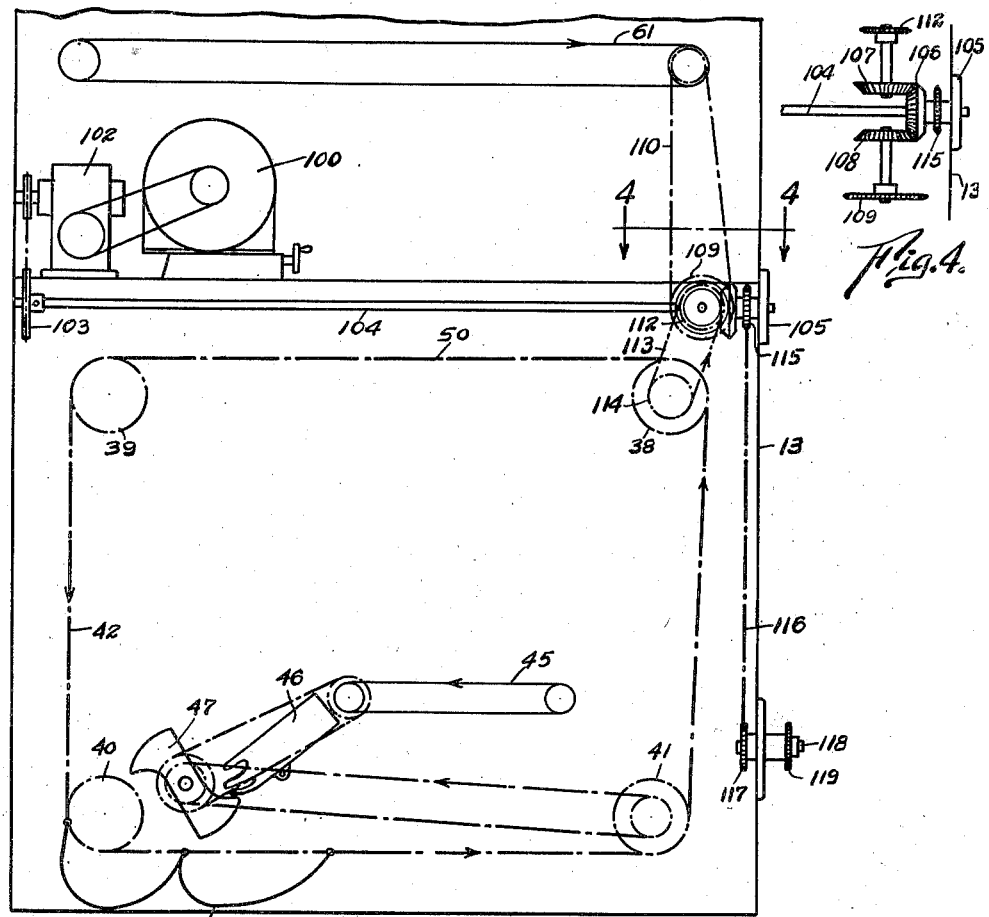
Fig. 3 is a fragmental front elevational view showing schematically the driving means for various moving elements of the machine.
Fig. 4 is a top view of certain gearing as seen from the plane of line 4—4 of Fig. 3.

In Figs. 1 and 2, the characters 145 indicate hinges for various doors which provide access to the interior of the machine. Such doors have been omitted from Fig. 3, as that view is more or less schematic of nature.

What is claimed is:

1. A dough handling machine including a lump transfer section comprising a driven endless pocket-conveyor having an upper pocket-supporting reach and a lower pocket-supporting reach connected thereto, means within the enclosure formed by said endless conveyor for feeding dough lumps to the pockets of the lower reach, and means for discharging said lumps when the pockets supporting them assume predetermined positions along the upper reach of the endless conveyor, said discharging means including mechanism for emptying a plurality of pockets simultaneously, a proofing section adjacent to the lump transfer section, and means for guiding the simultaneously discharged lumps to the proofing section of the machine.

2. A dough proofing machine comprising in combination a lump transfer section and a proofing section, a driven endless conveyor and pockets carried by the conveyor, said conveyor having an upper substantially horizontal reach and a lower reach connected thereto, means located between said reaches for loading with dough lumps the pockets of the lower reach of the conveyor, means for inverting simultaneously a plurality of the loaded pockets at the upper reach of the conveyor, to discharge the lumps therefrom in unison, a proofing section conveyor, means for guiding the simultaneously discharged lumps into the proofing section conveyor whence the dough lumps are carried by said conveyor along a sinuous path to proof the lumps, means for guiding a short length of the proofing section conveyor to a discharging location directly above the inverting means of the transfer section, and means operative upon said short length of the proofing section conveyor to dislodge the proofed lumps directly above the location of the loading means.

3. A dough proofing machine comprising in combination a lump transfer section and a proofing section, a driven endless conveyor and pockets carried by the conveyor, said conveyor having an upper substantially horizontal reach and a lower reach connected thereto, means located between said reaches for loading with dough lumps the pockets of the lower reach of the conveyor, means for inverting simultaneously a plurality of the loaded pockets at the upper reach of the conveyor, to discharge the lumps therefrom in unison, a proofing section conveyor, means for guiding the simultaneously discharged lumps into the proofing section conveyor whence the dough lumps are carried by said conveyor along a sinuous path to proof the lumps, means for guiding a short length of the proofing section conveyor to a discharging location above the inverting means of the transfer section, and means operative upon said short length of the proofing section conveyor to dislodge the proofed lumps in the region of the loading means.

4. A dough proofing machine comprising in combination a lump transfer section and a proofing section, a driven endless conveyor and pockets carried by the conveyor, said conveyor having an upper substantially horizontal reach and a lower reach connected thereto, means located between said reaches for loading with dough lumps the pockets of the lower reach of the conveyor, means for inverting simultaneously a plurality of the loaded pockets at the upper reach of the conveyor, to discharge the lumps therefrom in unison, a proofing section conveyor comprising a series of vertical runs including a charging run located adjacent to the lump transfer section of the proofing machine, means for guiding the simultaneously discharged lumps into the pockets of said charging run of the proofing section conveyor whence the dough lumps are carried by said conveyor along a sinuous path to proof the lumps, means for guiding a short length of the proofing section conveyor to a discharging location above the inverting means of the transfer section, and means operative upon said short length of the proofing section conveyor to dislodge the proofed lumps in the region of the loading means, whereby both the lump loading and lump unloading operations of the machine are effected at such a location as may be attended from a single station of observation at the front of the machine.

5. A dough handling machine comprising in combination, a proofing section cabinet including a series of conveyor guide wheels, an endless conveyor comprising pockets, and supported upon said wheels to provide a series of vertical runs for carrying the pockets upwardly and downwardly along a sinuous path within the proofing section cabinet, the cabinet having a front portion at which the pockets of one of the vertical conveyor runs is to be charged with dough lumps, an elevated overhanging projection at the front portion of the proofing section cabinet and a conveyor guide wheel in the overhanging projection for supporting the endless conveyor to provide a pair of substantially horizontal elevated conveyor runs extending outwardly from the series of vertical runs, means for discharging dough lumps from the conveyor pockets while disposed along the conveyor at one of said horizontal runs, and means beneath the discharging means for charging with dough lumps the pockets of said vertical run which is located at the front portion of the cabinet.

6. A dough handling machine comprising in combination, a proofing section cabinet including a series of conveyor guide wheels, an endless conveyor comprising pockets, and supported upon said wheels to provide a series of vertical runs for carrying the pockets upwardly and downwardly along a sinuous path within the proofing section cabinet, the cabinet having a front portion at which the pockets of one of the vertical conveyor runs is to be charged with dough lumps, an elevated overhanging projection at the front portion of the proofing section cabinet and a conveyor guide wheel in the overhanging projection for supporting the endless conveyor to provide a pair of substantially horizontal elevated conveyor runs extending outwardly from the series of vertical runs, means for discharging dough lumps from the conveyor pockets while disposed along the conveyor at one of said horizontal runs, a lump transfer cabinet mounted at the front portion of the proofing section cabinet and beneath the discharging means, an endless lump charging conveyor having upper and lower runs in said lump transfer cabinet, a lump charging means mounted between the upper and lower runs of the last mentioned conveyor for feeding dough lumps thereto, and means for transferring the lumps of dough from said last mentioned conveyor to that vertical run of the proofing section conveyor which is located at the front portion of the proofing section cabinet.

7. A dough proofing machine comprising in combination a lump transfer section, and a separate proofing section having a projection overhanging the lump transfer section, a driven endless conveyor in the lump transfer section and including flexible loop pockets carried by the conveyor, said conveyor having an upper substantially horizontal reach and a lower reach connected thereto, means located between said reaches for loading with dough lumps the pockets of the lower reach of the conveyor, means for inverting simultaneously a plurality of the loaded pockets at the upper reach of the conveyor, to discharge the lumps therefrom in unison, a proofing section conveyor including a series of vertical conveyor runs all located within the proofing section and outside the lump transfer section, means for guiding the simultaneously discharged lumps into the proofing section and upon its conveyor whence the dough lumps are carried by said conveyor along a sinuous path to proof the lumps, means for guiding a short length of the proofing section conveyor to a discharging location at the overhanging projection of the proofing section, and above the inverting means of the transfer section, and means operative to dislodge the proofed dough lumps from the overhanging projection of the proofing section into the interior of the lump transfer section.

8. In a dough working machine, the combination with an endless driven proofing conveyor for dough lumps, of a dough lump charging apparatus for said proofing conveyor, comprising a second driven endless conveyor and means supporting the latter in a substantially parallelogrammic formation, whereby to provide upper and lower substantially horizontal conveyor runs connected by opposed inclined runs, flexible loop pockets carried by said second conveyor, the flexing of the pockets enabling shifting of dough lumps therein when the pockets ascend one of the inclined runs of said second conveyor as said conveyor travels in one direction of movement, means for inverting the flexible loop pockets at the upper run of the second conveyor, and means included within the parallelogrammic formation thereof for feeding and timing the feed of dough lumps to the flexible pockets of the lower run of the second conveyor.

9. In a dough working machine, the combination with an endless driven proofing conveyor for dough lumps, of a dough lump charging apparatus for said proofing conveyor, comprising a second driven endless conveyor and means supporting the latter in a substantially parallelogrammic formation, whereby to provide upper and lower substantially horizontal conveyor runs connected by opposed inclined runs, flexible loop pockets carried by said second conveyor, the flexing of the pockets enabling shifting of dough lumps therein when the pockets ascend one of the inclined runs of said second conveyor as said conveyor travels in one direction of movement, means for inverting the flexible loop pockets at the upper run of the second conveyor, and means included within the parallelogrammic formation thereof for feeding and timing the feed of dough lumps to the flexible pockets of the lower run of the second conveyor, and a series of chutes inclined and extending transversely to the parallelogrammic formation of said second conveyor, for receiving dough lumps from the inverted pockets for delivery thereof to a proofing conveyor station outside the limits of said parallelogrammic formation of the second conveyor.

10. In a lump charging apparatus for dough proofers, the combination of an endless driven conveyor comprising two endless chains, pairs of sprockets having parallel axles arranged to support the chains in parallelism one to the other, and in a parallelogrammic formation with each chain disposed for providing an upper run and a lower run connected by opposed inclined runs, dough lump pockets supported between the chains, and means for inverting the pockets at the upper run of the conveyor for discharge of dough lumps therefrom, and means including a pick-up drum located within the confines of the parallelogrammic conveyor formation and rotatable about an axis parallel to the axles of the sprockets, for charging the pockets of the lower run of the conveyor with dough lumps.

SIGMUND SCHIFF.